Feb. 5, 1963 J. FAVALIER ETAL 3,076,917

ELECTRONIC TUNING DEVICES FOR KLYSTRON VALVES

Filed May 2, 1960

Jean Favalier
and
Claude E. G. Romiguiere
Inventors

By
Stone & Mack. Attorneys.

United States Patent Office 3,076,917
Patented Feb. 5, 1963

3,076,917

ELECTRONIC TUNING DEVICES FOR KLYSTRON VALVES

Jean Favalier and Claude Emile Georges Romiguiere, Paris, France, assignors to Compagnie Francaise Thomson-Houston, Paris, France, a French body corporate Filed May 2, 1960, Ser. No. 26,098
Claims priority, application France May 5, 1959
4 Claims. (Cl. 315—5.21)

Figures 1, 2:
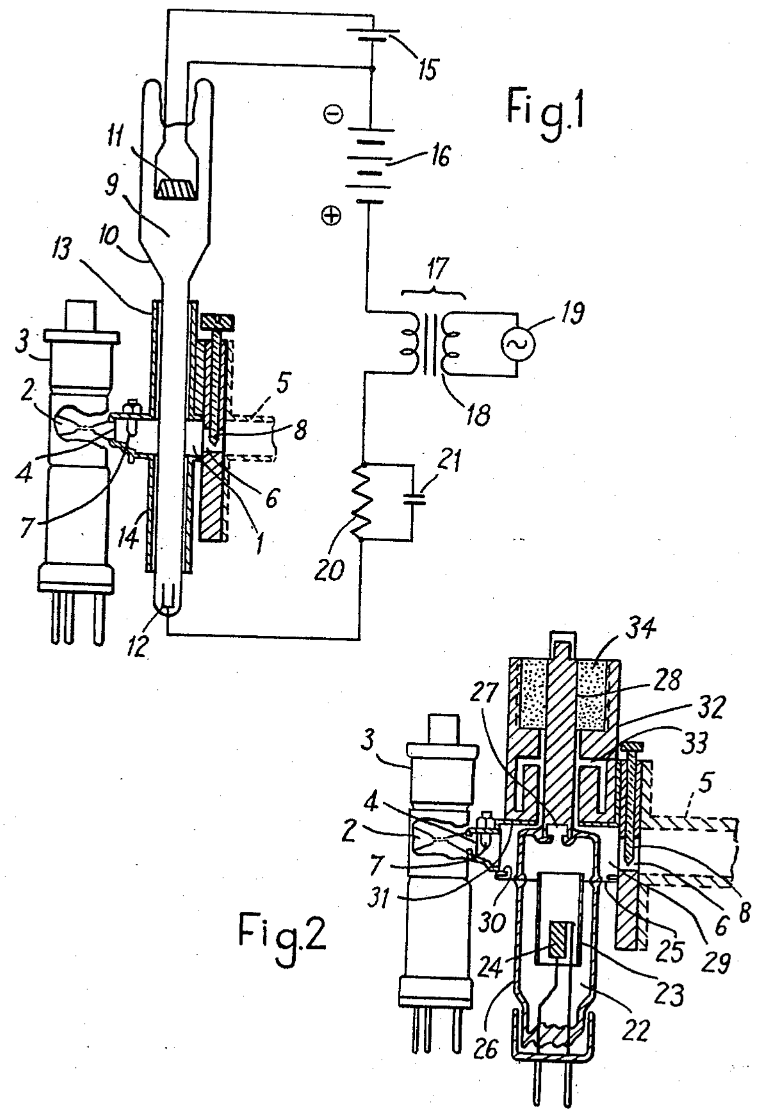

The present invention relates to a new device permitting the tuning or frequency modulation of the cavity resonator of a klystron, particularly of a reflex klystron valve, by means of a discharge in a gas.

Methods of cavity tuning using only purely electrical means have the advantage over mechanical methods, such as deformation of the wall of the cavity, of offering a very low inertia, thus permitting frequency modulation of the oscillation.

Among the methods of electrical tuning applicable to the reflex klystron, the commonest consist in varying the potential of the reflector in order to control the reactive component of the impedance of the electron stream. This method has the advantage of extremely low inertia in the tuning, permitting for example modulation to video frequencies. It has however the serious disadvantage of a rather restricted frequency shift. For current klystron models, this does not generally exceed 0.3% of the central frequency.

In order to extend the frequency shift, it has been proposed to tune the klystron cavity by means of a gaseous plasma of regulable density. The conductivity of such a plasma, composed of ions and electrons, has in fact a reactive component which is negligible at low frequencies in relation to the real component, but has a magnitude which increases with the frequency. This component is due to the fact that the oscillation of the load carriers is in quadrature with that of the electric field. As the oscillations of the ions are very weak at very high frequencies because of their great mass, it is almost exclusively the electrons which thus contribute to the conductivity. In these circumstances, the conductance $\sigma$ of the plasmas follows the formula:

$$\sigma=\frac{Ne^2}{m}\left(\frac{\nu}{\nu^2+\omega^2}\right)-j\frac{\omega}{\nu^2+\omega^2}\Big)$$

where

N designates the electronic density, $e$ the charge and $m$ the mass of the electron, $\nu$ the frequency of collision of the electrons with the molecules of gas, $\omega$ the pulsation of the electric field.

For $\omega$ increasing and of much greater value than $\nu$, the conductivity $\sigma$ becomes practically an imaginary number. This condition is fulfilled by selecting a gas having a small effective collision section, at a sufficiently low pressure. As the formula shows, the plasma then has a dielectric constant E lower than that of a vacuum, and the difference E—1 is proportional to the density of the electronic gas. For low values of the H.F. field which cannot maintain the discharge, the density of the electronic gas can be regulated by means of the direct current maintaining the discharge, which permits acting on the dielectric constant of the plasma. By establishing a discharge in the H.F. electric field of a cavity, it is therefore possible to tune this cavity electrically and by modulating the discharge current sinusoidally, a frequency modulation of the cavity is obtained. It is true that the variations of the electronic density do not follow those of the discharge current without a certain delay, which is due mainly to the inertia of the deionisation, which limits the modulation frequency, for example to values below $10^5$ cycles per second. On the other hand, very wide frequency shifts are obtained, for example of the order of a multiple of what the impedance modulation of an electron stream makes it possible to obtain.

Nevertheless, this method to the tuning of klystrons has not been used in industry. The reason for this is the difficulty of associating in an effective and at the same time simple manner a gaseous plasma and a klystron cavity resonator which is under a high vacuum. Cavities other than those of klystrons have been tuned with the aid of a discharge tube passing through them in the region of the greatest field strength. Now, in the klystron the central part is occupied by the electron stream, whereas in the peripheral portions of the cavity, the field is too weak.

The solution adopted hitherto consisted in providing in the wall of the cavity, in addition to the output window, a second window through which a secondary resonant cavity enclosing a gaseous plasma was coupled. This cavity could itself be filled with gas, or else enclose an independent discharge tube. In all cases, the second window had to be vacuum tight, like the output window. The disadvantage of this arrangement is obvious to the designer of electronic tubes, because the production of the vacuum tight windows, and particularly the connection and the exhausting of the tubes provided with these windows call for particular care. Despite every care in manufacture, inspection of the finished tubes reveals an appreciable percentage of tubes which cannot be used, this percentage being still higher in the case of a second window.

An object of the present invention is a klystron tuning device utilizing a discharge in a gas, which is simpler to manufacture than known devices and which is more robust in operation. In addition, it possesses the advantages of a more compact form, low weight, and small size.

A tuning device according to the invention is constituted by a resonant cavity, which will hereinafter be referred to as the "tuning cavity," and which is traversed parallel to the electric field by a gas discharge tube and coupled by means of two separate coupling means, on the one hand to the klystron cavity and on the other hand to the useful load.

The discharge tube encloses, in an insulating enclosure, a gas or gas mixture having a conductivity of an almost purely reactive nature at very high frequencies, such as neon at a pressure of 5 mm. mercury. In accordance with a preferred alternative embodiment, this tube has a hot cathode which can be surrounded by an auxiliary cylindrical electrode.

The connection of the gas tube to the tuning cavity must permit the avoidance of H.F. power leaks. It is advantageous to make this connection in accordance with one of the two following arrangements. In the first, the gas tube passes through sleeves fixed externally on the cavity and having a diameter smaller than the diameter defined by the rupture frequency of this sleeve. In this case, the anode and cathode bushings are placed at the ends of the enclosure. In the second alternative, the gas tube has an auxiliary electrode of cylindrical form surrounding the cathode and the outlet of which is constituted by a coaxial disc and a cylindrical outlet anode. When the tube is placed in position in the cavity, the disc-shaped bushing comes to bear against the edge of the passage orifice of the tube, where it is fixed with the aid of a screw, or directly by soft soldering. The anode outlet passes out of the cavity through an H.F. trap structure without direct contact with the cavity. These two arrangements offer the advantage of permitting easy replacement of the gas tube.

The means of coupling between the tuning cavity and the klystron cavity on the one hand and the load line on the other hand are preferably screw-regulated irises. The first is so tight a coupling that the variations of reactance caused by the discharge in the tuning cavity give rise to a substantial variation in impedance in the klystron cavity. The load coupling is generally weaker and is adjusted to the desired rate of damping of the klystron cavity.

As the result of the new arrangement of the klystron, the load line, and the tuning cavity, it becomes possible to reduce the number of tight windows to one, namely that separating the klystron cavity from the tuning cavity, since the charge and the tuning cavity operate in the open air. In addition, the new assembly is more compact and lighter. In fact, the old arrangements necessitated two transition elements, connecting the cylindrical cavity of the klystron to the tuning cavity on the one hand and to the load on the other hand The new assembly requires only one, connecting the klystron to the tuning cavity, since the latter is immediately connected to the charge by means of a simple support.

In order to understand better the technical characteristics of the present invention, two examples of performance thereof will now be described with reference to the accompanying drawings, by way of example only, and in which:

FIGURE 1 shows diagrammatically in section a tuning device according to the invention, applied to a reflex klystron, the klystron being shown partly broken away, FIGURE 2 shows, in a similar fashion, a modification of a tuning device according to the invention.

Referring to FIGURE 1, there is shown a tuning device constituted by a tuning cavity 1 coupled on the one hand to the cavity 2 of a reflex klystron 3 by the window 4 and on the other hand to the load line 5 (in broken lines) by the orifice 6, while the extent of these couplings can be adjusted by the screws or probes 7 and 8. A gas tube 9 having an insulating casing 10 and provided with a hot oxide cathode 11 and an anode 12 passes through the cavity 1 parallel to the electric field. The tube contains a gas under low pressure, e.g. neon at a pressure of the order of 5 mm. mercury. In order to avoid H.F. power leaks, the edges of the two passage orifices are connected to tubes 13 and 14, the geometry of which is designed to prevent the transmission of electric waves at the frequency of oscillation. A convenient power source, shown as a battery 15, supplies the cathode heating current. The circuit used for frequency modulation of the klystron has been shown in the anode circuit. It includes a source of voltage, schematically illustrated as a battery 16, of a few hundred volts, a modulation transformer 17 the primary winding 18 of which is connected to a modulation generator schematically illustrated at 19, and a discharge stabilising resistance 20 in parallel with a decoupling capacitance 21.

In this arrangement, the H.F. field has the greatest strength in a cylindrical zone surrounding the passage orifices of the gas tube, and which is therefore situated outside the said tube.

FIGURE 2 shows a modified arrangement according to the invention, which permits tighter coupling between the plasma and the H.F. field, the region of greatest strength of the H.F. field being situated in the actual gas tube. This region extends between electrodes which delimit a portion of plasma. To this end, the gas tube 22 has a cylindrical electrode 23 surrounding the hot cathode 24 and introduced into the central orifice of a disc 25 made of the material known under the registered trademark "Kovar." This disc passes through the glass bulb 26 of the tube. The anode 27, in the form of a cup, is constituted by the end of a solid cylinder 28 also of "Kovar." The edge of the bowl is sealed to the glass bulb. The tube is also filled with a gas under low pressure, as in FIGURE 1. The tuning cavity 29 has an opening of large diameter, on the edge 30 of which is soldered the disc 25 of the tube 22, and an opening of smaller diameter in the opposite wall 31. In line with this opening there is disposed, outside the cavity, a metallic structure of revolution 32 serving on the one hand as external conductor of a coaxial line, the internal conductor of which is the anode bushing 28, and on the other hand as an H.F. trap, due to the presence of a groove 33, opening at a distance of a quarter wavelength from the wall 31. From the point of view of H.F. potential, the cylindrical electrode 23 and the anode 27 are thus connected to the walls of the cavity. An insulating stopper 34 enables the anode end of the tube 22 to be centred. The other elements of the tuning device, and also the klystron with which it is associated, are identical to the parts in FIGURE 1 designated by the reference numerals 2 to 8.

We claim:

1. An electronic tuning arrangement for a klystron valve incorporating a cavity resonator, comprising a tuning cavity, a discharge tube associated with said tuning cavity, said discharge tube being located within an insulated casing and comprising at least one thermionic cathode, a cylindrical electrode surrounding said cathode, a plane bushing connected to said cylindrical electrode and forming one wall of said tuning cavity, an anode, a cylindrical bushing solid with said anode, said cylindrical bushing having a diameter less than that of said plane bushing and passing into the opposite wall of said tuning cavity without coming into ohmic contact therewith, said discharge tube containing a gas under low pressure, a load circuit, means coupling said tuning cavity to said cavity resonator, means coupling said tuning cavity to said load circuit, a tubular structure located outside said tuning cavity around said cylindrical bushing, said tubular structure and said cylindrical bushing constituting a co-axial line having an H.F. trap, and insulating plug means centering said cylindrical bushing within said tubular structure.

2. An electronic tuning device for a klystron valve incorporating a cavity resonator, comprising a tuning cavity having two openings therein, a load circuit, means coupling a first one of said openings to said load circuit, means coupling the second one of said openings to said klystron valve through a hermetic window in the cavity thereof, a discharge tube passing through said tuning cavity, said discharge tube comprising an insulating envelope, a cavity, an anode and a gas at very low pressure within said envelope, and said cathode being of the thermionic emission type, a disc forming a portion of the wall of said tuning cavity, a cylindrical member connected to said disc and said cathode being located inside said cylinder, a cylindrical cross member having a smaller diameter than said disc passing through the wall of said cavity opposite said cathode and without ohmic contact with said cavity, a tubular structure surrounding said cylindrical cross member, said tubular structure terminating in said cavity and forming with said cylindrical cross member a coaxial line incorporating a high frequency trap.

3. An electronic tuning device for a klystron valve incorporating a cavity resonator, comprising a tuning cavity having two openings therein, a load circuit, means coupling a first one of said openings to said load circuit, means coupling the second one of said openings to said klystron valve through a hermetic window in the cavity thereof, a discharge tube passing through said tuning cavity, said discharge tube comprising an insulating envelope, a cavity, an anode and a gas at very low pressure within said envelope, and said cathode being of the thermionic emission type, a disc forming a portion of the wall of said tuning cavity, a cylindrical member connected to said disc and said cathode being located inside said cylinder, an anode formed from a metal rod having a cup at one end and having a smaller diameter than said disc passing through the wall of said cavity opposite said cathode but leaving a gap between said anode and said wall and a tubular structure surrounding and spaced from said anode outside said cavity, said tubular structure terminating in said cavity and forming with said anode a coaxial line incorporating a high frequency trap.

4. An electronic tuning device for a klystron valve incorporating a cavity resonator, comprising a tuning cavity having two openings therein, a load circuit, means coupling a first one of said openings to said load circuit, means coupling the second one of said openings to said klystron valve through a hermetic window in the cavity thereof, a discharge tube passing through said tuning cavity, said discharge tube comprising an insulating envelope, a cavity, an anode and a gas at very low pressure within said envelope, and said cathode being of the thermionic emission type, a disc forming a portion of the wall of said tuning cavity, a cylindrical member connected to said disc and said cathode being located inside said cylinder, an anode formed from a metal rod having a cup at one end and having a smaller diameter than said disc passing through the wall of said cavity opposite said cathode but leaving a gap between said anode and said wall, a tubular structure surrounding and spaced from said anode outside said cavity, said tubular structure terminating in said cavity and forming with said anode a coaxial line incorporating a high frequency trap, said tubular structure being recessed, and insulating material in said recess of said tubular structure to centre said anode in said tubular structure.

References Cited in the file of this patent

UNITED STATES PATENTS

| | | |
|---|---|---|
| 2,241,976 | Blewett et al. | May 13, 1941 |
| 2,501,545 | Sproull | Mar. 21, 1950 |
| 2,527,770 | Smith | Oct. 31, 1950 |
| 2,557,180 | Fiske | June 19, 1951 |
| 2,806,977 | Carter | Sept. 17, 1957 |
| 2,813,999 | Foin | Nov. 19, 1957 |